Patented Jan. 11, 1949

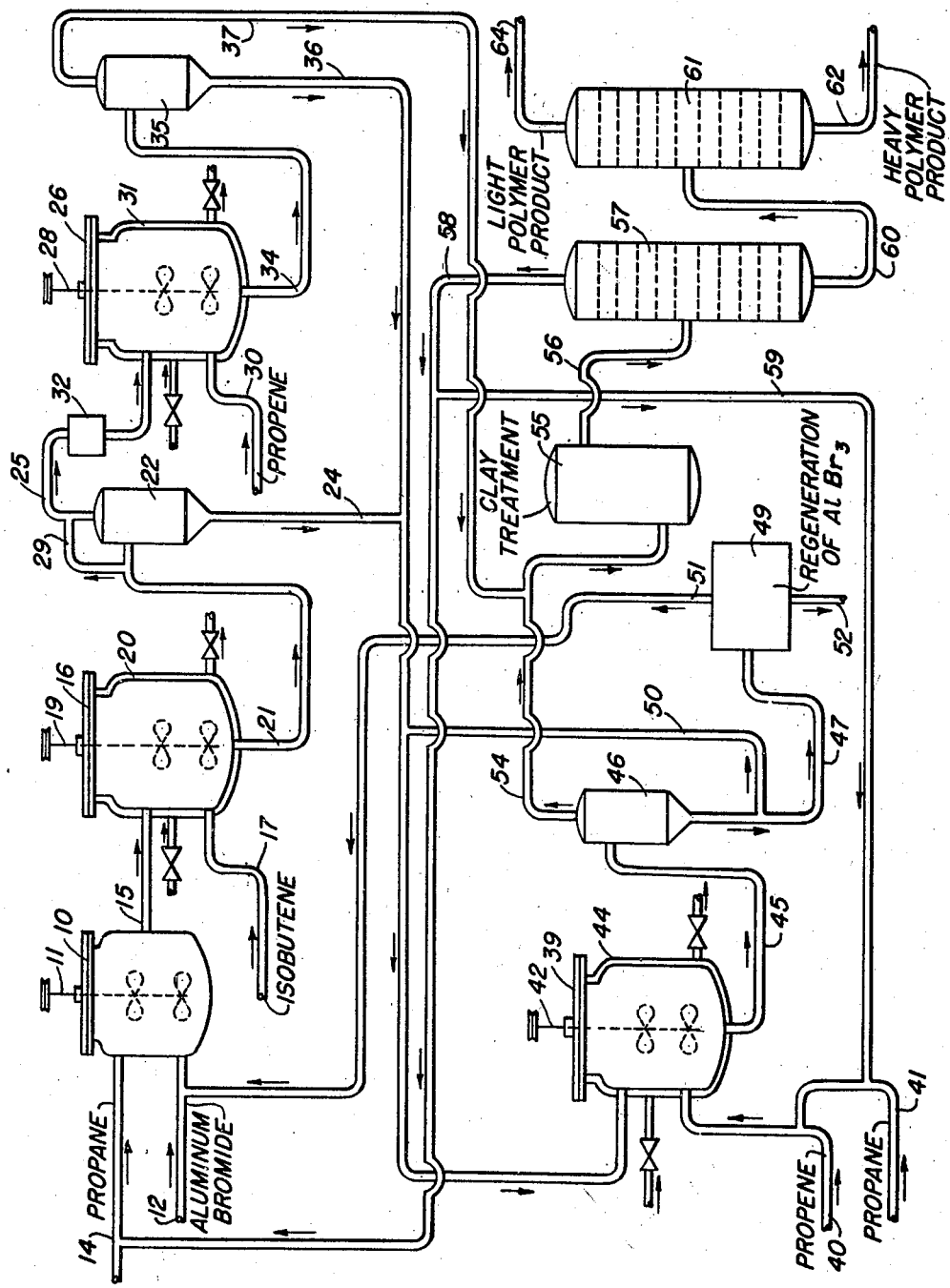

2,458,977

UNITED STATES PATENT OFFICE 2,458,977

HYDROCARBON CONVERSION PROCESS

Don R. Carmody, Dallas, Tex., assignor, by mesne assignments, to Socony-Vacuum Oil Company, New York, N. Y., a corporation of New York Application September 19, 1946, Serial No. 697,961

17 Claims. (Cl. 260—683.15)

This invention relates to the polymerization of olefins and relates more particularly to the polymerization of olefins by the use of dissolved olefin polymerization catalysts.

It is known that various olefins, such as propene, the isomeric butenes, pentenes, etc., may be polymerized in the presence of suitable catalysts to produce polymer products of viscosity varying from that of very light oils to semi-solid, rubbery compounds, depending upon the particular type of olefin, the particular type and concentration of catalyst, and the temperature of polymerization employed. Qualitatively, the viscosity of the polymer product obtained will be inversely proportional to the temperature of polymerization and, although to a lesser extent, directly proportional to the concentration of catalyst. Additionally, for any given catalyst, concentration of catalyst, and temperature of polymerization, comparatively high viscosity polymers will be generally obtained from readily polymerizable olefins, such as isobutene, than from moderately polymerizable olefins, such as propene and the 1-olefins, while with the less readily polymerizable olefins, such as the 2-olefins, comparatively low viscosity polymers will be obtained.

Particularly useful catalysts are the metal halides, such as aluminum chloride, aluminum bromide, ferric bromide, etc., and these may be employed in the form of solutions, aluminum chloride being dissolved, for example, in an alkyl halide such as ethyl or propyl chloride, and aluminum bromide being dissolved, for example in a saturated hydrocarbon, such as propane or normal butane. As the polymerization reaction progresses, the metal halide catalysts form complexes with the hydrocarbons in the reaction mixture and these complexes, while possessing catalytic activity, are not capable of producing polymers having the viscosity of those produced by the dissolved catalyst itself. Consequently, as the reaction progresses, the concentration of catalyst continually decreases and the polymer product finally obtained will be a mixture of high viscosity product produced at the beginning of the reaction where the catalyst concentration was high and progressively lower viscosity products produced at subsequent stages of the reaction where the catalyst concentration was progressively lower through formation of complex.

Following the reaction, the complex is removed from the reaction mixture and the remainder of the dissolved catalyst is removed from the reaction mixture by washing with water, alcohol, or caustic, by absorbing on clay, or by heating to cause additional complex formation. By washing or absorbing, the catalyst is lost and is not recoverable. By heating, the catalyst may be recovered in the form of the complex but heating tends to crack the polymer product.

Clear cut separation of the high viscosity polymer by fractionation is impossible since the temperatures required for removal of the intermediate viscosity polymers, even with low pressure fractionation, result in cracking of the high viscosity product. Accordingly, where the high viscosity products are desired, it has been the practice to stop the polymerization reaction before the catalyst concentration has decreased to a point where the low viscosity products begin to form. However, this involves the disadvantage that the reaction mixture still contains an appreciable concentration of catalyst, which may be as high as 50 per cent of the original concentration, and, as hereinbefore indicated, is either lost by the procedures of washing or absorption, or recovered by heating with concomitant cracking of the polymer product. Thus, heretofore, high viscosity polymers have been obtained only at the expense of incomplete utilization of the halide catalyst.

It is an object of this invention to obtain substantially complete utilization of dissolved metal halide polymerization catalyst. It is another object of this invention to obtain maximum yield of a high viscosity polymer and maximum yield of a low viscosity polymer per unit amount of catalyst employed. It is another object of this invention to obtain maximum yield of high viscosity polymer product with maximum utilization of catalyst. Further objects and advantages of the invention will become apparent from the following description thereof.

In accordance with the invention, dissolved metallic halide polymerization catalyst is contacted as a first step with a comparatively highly active olefin under suitable reaction conditions to produce a viscous polymer product, thereafter is contacted as a second step with a less active olefin under suitable reaction conditions to produce a less viscous polymer product, catalyst complex is removed from the reaction mixture and contacted as a third step with either a highly active olefin or a less active olefin under suitable reaction conditions to produce a polymer product having a viscosity similar to the viscosity of the polymer product produced in the second step. Used catalyst complex is removed from the reaction mixture from the third step and the metallic halide catalyst recovered therefrom for reuse.

The remainder of the reaction mixture is then admixed with the reaction mixture from the second step and the high viscosity and low viscosity polymers recovered as separate products therefrom. By this process, the mixture of polymer products from the three stages contains only high viscosity products and low viscosity products without admixture of intermediate viscosity products and clear cut separation of high viscosity and low viscosity products may be effected without danger of cracking the high viscosity products. The second polymerization step may be continued until the catalyst concentration decreases below its effective concentration and the third polymerization step may be continued until the complex is no longer effective as a polymerization catalyst. Accordingly, practically complete utilization of catalyst is obtained with maximum yields per unit amount of catalyst of high and low viscosity polymers.

One type of olefin is used in the first step of the reaction and a different type of olefin is used in the second step. In the third step, either the same type of olefin is employed as in the first or second steps, or an entirely different type of olefin is employed. The use of the same olefin for both the first and second steps is disclosed and claimed in my copending application, Serial No. 697,962, filed September 19, 1946.

Any desired type of olefin may be used in the first polymerization step of the process and any desired other type of olefin may be employed in the second polymerization step. However, under the reaction conditions of both steps, the olefin employed in the first step must be an olefin which will produce a polymer product having a high viscosity, as compared with the viscosity of the product produced in the second step, to permit separation of the products by fractionation. The olefin employed in the third polymerization step may be the same as or different from the olefins employed in the first or second stages. However, the olefin should be such that under the reaction conditions employed, a polymer product will be obtained having a viscosity similar to the viscosity of the polymer product produced in the second step, in order that the polymer products from these two steps may be separated from the polymer product produced in the first step.

Examples of suitable combinations of olefins for use in the first and second polymerization steps are as follows:

|   | First Step | Second Step |
|---|---|---|
| (1) | Isobutene | 1-Olefin. |
| (2) | do | 2-Olefin. |
| (3) | 1-Olefin | Do. |

By 1-olefin is meant an olefin having the double bond on a terminal carbon atom and having no more than one alkyl substituent on the carbon atom once removed from the terminal carbon atom. Examples of suitable 1-olefins are propene, 1-butene, 1-pentene, 1-hexene, 1-octene, etc. The 1-olefin may be a branched chain olefin or a straight chain olefin, but isobutene is excluded from this classification for the purposes of the invention since its activity is much greater than the activity of the other 1-olefins and, with respect to the above definition of 1-olefin, has two alkyl substituents on the carbon atom once removed from the terminal carbon atom. By 2-olefin is meant an olefin having the double bond between the second and third carbon atoms of a chain. Examples of suitable 2-olefins are 2-butene, 2-pentene, 2-hexene, etc. Either isobutene, a 1-olefin, or a 2-olefin may be employed in the third stage.

The olefin feed streams employed need not be streams of the pure olefins but may be mixtures of olefins. It is only necessary that the olefins contained in the streams be such as to give polymer products of the proper viscosity in the various polymerization steps under the conditions employed to permit effective separation. The olefin feed streams may also contain saturated straight chain hydrocarbons, but it is preferred to keep the reaction mixtures free of saturated branched chain hydrocarbons.

In carrying out the invention, the polymerization reaction in the first stage may be continued until the catalyst concentration decreases by complex formation or otherwise to a point where the viscosity of the product obtained begins to decrease below the desired viscosity. The polymerization reaction in the second stage may likewise be continued until the catalyst concentration decreases to a value below which the polymer product of desired viscosity will not be obtained. The polymerization reaction in the third stage may be continued until the complex has become exhausted or until its activity has decreased to any intermediate point below which it is not desired to go.

The first and second stages may be carried out in separate reaction zones, or, if desired, may be carried out in a single reaction zone. Where the latter procedure is employed, the desired olefin may be passed to the reaction zone to effect the first stage of the process. Passage of the olefin may then be discontinued and the other olefin passed to the reaction zone to effect the second stage of the process. The third stage of the process is preferably carried out in a separate reaction zone since the amount of complex present in the reaction mixture from the second stage usually will be insufficient for effective polymerization.

The catalyst employed may be any of the solid metallic halides known to be olefin polymerization catalysts and which are soluble in a solvent having no deleterious effect on the polymerization reactions. Examples of such catalysts are aluminum bromide, aluminum chloride, ferric bromide, etc. Aluminum chloride is not readily soluble in hydrocarbons but is soluble in alkyl halides such as ethyl chloride, propyl chloride, etc., in nitromethane, etc., and accordingly the process of the invention may be applied where aluminum chloride is employed in solution in such solvents. Aluminum bromide is soluble in hydrocarbons such as propane, normal butane, cyclohexane, etc., and may be employed dissolved in these and other hydrocarbon solvents in which an aluminum bromide-hydrocarbon complex does not too readily form under the conditions of the polymerization reactions and which do not deleteriously affect the reactions. Propane, normal butane, cyclohexane, etc., may also be employed as diluents in the polymerization reactions and the process of the invention is preferably applied where aluminum bromide dissolved in these hydrocarbon solvents is employed since thereby the necessity of completely removing non-hydrocarbon solvents from the polymer product is eliminated.

The first and second stages of the reaction may be carried out at the same termperatures or at different temperatures, depending upon the types of olefins employed, but the temperatures and other reaction conditions must be such that the viscosities of the products obtained in both stages are sufficiently different to permit separation. The same considerations with respect to temperature and other reaction conditions apply to the third stage; i. e., the product must have a viscosity such as to permit separation from the product produced in the first stage. Additionally, the temperature and other reaction conditions in the second and third stages must be such that the viscosity of the products is sufficiently low to permit them to be separated from the polymer products produced in the first stage at temperatures that will avoid cracking. Where the viscosity of the product produced in the first stage differs from the viscosity of the products produced in the second and third stages by at least 500 Saybolt Universal seconds at 210° F. and the viscosity at 210° F. of the products produced in the second and third stages is not greater than about 125 Saybolt Universal seconds, separation may be readily effected, although separation may be effected where the differences in viscosity are somewhat less than 500 seconds and the viscosity of the products produced in the second and third stages is somewhat greater than 125 seconds. Preferably, the first stage of the reaction is carried out below about 0° C., such as −30° C., or lower, and the second and third stages of the reaction are carried out between 0° C. and 75° C.

Any suitable concentration of dissolved metallic halide catalyst and ratio of solvent and diluent to olefin may be employed in the first and second stages. When employing aluminum bromide as catalyst and saturated hydrocarbons as solvents and diluents, a concentration of between 0.05 and 3 mols of catalyst per 100 mols of saturated hydrocarbon and a ratio of about 1 to 10 mols of saturated hydrocarbon per mol of olefin will be found satisfactory although other concentrations and ratios may be employed. The concentration of catalyst in the second stage will be less than in the first stage because of formation of complex and therefore a catalyst concentration must be selected for the first stage sufficiently high to provide an effective concentration in the second stage.

The polymerization reaction in the third stage may be carried out employing ratios of between 4 to 80 pounds of olefin per pound of complex depending upon the activity of the complex. Diluents are also employed in the reaction and may be used in a ratio of about 1 to 10 mols of diluent per mol of olefin. Contact times to be employed will depend upon the activity of the complex and may be as low as 10 seconds for high activity complex and as high as 30 minutes for low activity complex.

If desired, catalyst promoters may be employed to enhance the effect of the catalyst in the polymerization reactions. Suitable promoters are the hydrogen halides such as hydrogen bromide and hydrogen chloride. Hydrogen bromide may be used as a promoter for aluminum bromide or ferric bromide catalyst and as a promoter for the complexes produced from these metal halides. Hydrogen chloride may be used as a promoter for aluminum chloride catalyst and for the complexes produced from aluminum chloride. Other suitable catalyst promoters known to the art may also be employed. When employing aluminum bromide as catalyst and isobutene as feed to the first stage, however, it is preferred not to employ a promoter in the first stage, since as it has been found, the use of compounds which ordinarily have catalytic promoting effect in olefin polymerization reactions, anomalously, do not promote the aluminum bromide catalyzed polymerization of isobutene to yield high viscosity products.

The catalyst complex formed in the first stage may be removed from the reaction mixture following completion of the first stage or may be left in the reaction mixture and removed along with the complex formed in the second stage after the completion of that stage. Following completion of the third stage, the complex is removed from the reaction mixture for regeneration and recovery of catalyst. Removal of complex from the reaction mixtures may be accomplished by means of gravity settling or centrifuging. The catalyst may be regenerated and recovered from the complex for reuse by any suitable procedure known to the art. A suitable procedure for regeneration and recovery of aluminum bromide from the complex comprises destructive distillation of the complex to vaporize the aluminum bromide therefrom followed by condensation of the vaporized catalyst.

The reaction mixture from the first and second stages is combined with the reaction mixture from the third stage after removal of complex. The combined mixtures may then be treated for the removal of any dissolved catalyst that may not have been converted to complex. Removal of any such catalyst may be accomplished by washing the reaction mixture with water, caustic, or alcohol, or by treating the reaction mixture with a clay such as Filtrol clay or bentonite. Preferably, the reaction products are treated with clay, even if a water, caustic, or alcohol wash has been employed, in order to remove any traces of complex or other undesirable impurities which may not otherwise have been removed. Thereafter, the reaction mixture may be stripped to remove the diluent and solvent, and the diluent and solvent recycled.

The combined mixtures, free of dissolved catalyst, diluent, and solvent, may then be fractionated to separate the light polymer product from the heavy polymer product. Suitable temperatures and pressures of fractionation known to the art may be employed and will depend upon the viscosities of the polymer products. Generally, a bottoms temperature of about 430° F. and a pressure of about 3 millimeters of mercury will be found to be satisfactory.

The high viscosity polymer products, where isobutene or 1-olefins have been employed in the first stage, are suitable as lubricating oils, lubricating oil addition agents, etc. The polymer products produced in the first stage may be viscous oils or semi-solid materials. The low viscosity polymer products from 1-olefins or 2-olefins are useful as light lubricating oils, intermediates for lubricating oil addition agents, chemical intermediates, etc.

The accompanying drawing is a flowsheet illustrating one embodiment of the invention.

Referring now to the drawing, aluminum bromide catalyst and liquid propane are passed into mixer 10, provided with stirrer 11, through lines 12 and 14, respectively, wherein the aluminum bromide is dissolved in the liquid propane. Solid aluminum bromide is difficult to dissolve and it is therefore preferred to pass the catalyst in the molten state into the mixer to effect ready dissolution, as disclosed in the copending application, Serial No. 546,389, filed July 24, 1944.

Sufficient propane is passed to mixer 10 to dissolve the aluminum bromide and provide the desired amount of diluent in the subsequent polymerization reaction. After solution has been effected, the solution is passed through line 15 to reactor 16. Isobutene is admitted to reactor 16 through line 17 and is intimately admixed with the aluminum bromide solution therein by means of stirrer 19. Sufficient pressure is maintained in the reactor to keep the hydrocarbons in the liquid phase and the desired temperature of polymerization may be maintained by passage of a suitable temperature controlling medium through jacket 20. Reaction mixture is continuously removed from the reactor, after a suitable residence time, through line 21.

The reaction mixture in line 21 contains aluminum bromide-hydrocarbon complex and the reaction mixture is passed to settler 22 where the complex settles out and is removed through line 24. The remainder of the reaction mixture is removed from the settler as overhead through line 25 and is passed to polymerization reactor 26 provided with stirrer 28. If desired, the reaction mixture in line 21 may be by-passed in whole or in part through line 29 to reactor 26 and removal of the complex contained therein postponed until after completion of the reaction in reactor 26.

Propene is passed into reactor 26 through line 30 and intimately stirred with the reaction mixture from reactor 16. Proper temperature is maintained within reactor 26 by passage of a suitable temperature controlling medium through jacket 31 and the reaction mixture from reactor 16 may be brought to the desired reaction temperature, if the temperature in reactor 26 is to be different from the temperature in reactor 16, by means of heat transfer means 32 in line 25. Pressures are sufficiently high to keep the hydrocarbons in the liquid phase. The reaction mixture is removed continuously after a suitable residence time through line 34 and passed to settler 35. The complex is removed through line 36, and the remainder of the reaction mixture is removed through line 37.

The complex in line 24 is admixed with the complex in line 36 and the mixture is passed to polymerization reactor 39 for complex-catalyzed polymerization of propene. Propene enters the reactor through line 40 and is admixed with propane diluent entering through line 41. The reaction mixture is intimately stirred by means of stirrer 42 and the desired temperature is maintained by passage of suitable temperature controlling medium through jacket 44. Pressures are sufficiently high to keep the hydrocarbons in the liquid phase. The reaction mixture, after suitable residence time, is removed from the reactor through line 45, and passed to settler 46 for removal of spent complex. The complex is removed through line 47 and passed to a regeneration zone 49, for removal and recovery of aluminum bromide from the complex. If desired, a portion of the complex in line 47 may be recycled to reactor 39 through line 50 connected with line 36. The regenerated aluminum bromide is removed from the regeneration zone through line 51 and recycled to line 12. Residue from the regeneration operation is removed through line 52.

The remainder of the reaction mixture from settler 46 is passed as overhead through line 54 and admixed with the overhead from settler 35 in line 37. The combined reaction mixtures are then passed through clay treater 55 for removal of any remaining complex or dissolved catalyst. Following the clay treatment, the reaction mixtures are passed through line 56 to depropanizer 57 where propane is removed as overhead through line 58 and after condensation (not shown) recycled to polymerization reactor 10 and to polymerization reactor 39 through line 59 connected between line 58 and line 41. Temperatures between 60° and 100° F., and pressures of 100–200 pounds per square inch gage are satisfactory for removal of the propane. The bottoms from depropanizer 57, comprising a mixture of the low and high viscosity products, are passed through line 60 to fractionator 61. High viscosity polymer is recovered as bottoms through line 62 and low viscosity polymer is recovered as overhead through line 64.

The following example will illustrate the results which may be obtained by the process of the invention.

Isobutene in the liquid phase was passed continuously into a stirring reactor along with liquid normal butane containing dissolved aluminum bromide in concentration of 0.5 mol per 100 mols of n-butane. No promoter was used. The ratio of n-butane to isobutene was 4 to 1. The reaction mixture was maintained at a temperature of $-30°$ C. and the residence time was 60 minutes. Under these conditions a semi-solid isobutene polymer is obtained. The reactor effluent, its concentration of dissolved aluminum bromide having decreased to 0.30 mol per 100 mols of n-butane, was then passed to a second stirring reactor maintained at 60° C. where propene was added thereto in a mol ratio of 1 to 1. No promoter was used and the residence time was 12 minutes. Reaction mixture from the second reactor was then passed to a settler and the complex allowed to settle out. The complex was removed from the settler and was admixed with about an equal volume of n-butane after which it was passed to a third stirring reactor along with liquid propene. Feed rate ratios were maintained at about 10 pounds of propene per pound of complex and the reaction mixture was maintained at a temperature of 30° C. The residence time was 30 minutes. The effluent from the third reactor was mixed with the effluent from the second reactor and the mixture treated with bentonite clay. The liquid n-butane was then stripped from the mixture and the remainder of the mixture fractionated at 3 mm. of mercury pressure to separate light polymer product from heavy polymer product. The heavy polymer was a semi-solid product having a viscosity too high to measure in Saybolt Universal seconds. Two per cent by weight of this product blended with a base stock lubricating oil having a 210° F. viscosity of 40.9 Saybolt Universal seconds and a viscosity index of 14 gave a blend having a 210° F. viscosity of 47.4 Saybolt Universal seconds and a viscosity index of 85. The light polymer product had a 210° F. viscosity of 65.0 Saybolt Universal seconds and a viscosity index of 50.

Having thus described my invention, it is to be understood that such descriptions have been given by way of illustration and example only and not by way of limitation, reference for the latter purpose being had to the appended claims.

I claim:

1. A process for the polymerization of olefins comprising admixing an olefin with a solution of metallic halide catalyst in a solvent under such reaction conditions as to produce high viscosity polymer product as a first step, discontinuing admixture of further of said olefin with said catalyst solution, maintaining said metallic halide catalyst in solution in said solvent and in admixture with said high viscosity polymer product, admixing a different type olefin from that employed in said first step with said catalyst solution containing said high viscosity polymer product under such reaction conditions as to produce a low viscosity polymer product as a second step, removing catalyst complex from the reaction mixture from said second step, admixing an olefin with said catalyst complex under such reaction conditions as to produce a polymer product having a viscosity similar to the viscosity of the polymer product produced in said second step as a third step, combining the reaction mixture from said second and said third steps, and recovering high viscosity and low viscosity polymer products as separate fractions therefrom.

2. A process for the polymerization of olefins comprising admixing an olefin with a solution of metallic halide catalyst in a solvent under such reaction conditions as to produce a high viscosity polymer product as a first step, discontinuing admixture of further of said olefin with said catalyst solution, maintaining said metallic halide catalyst in solution in said solvent and in admixture with said high viscosity polymer product, admixing a different type olefin from that employed in said first step with said catalyst solution containing said high viscosity polymer product as a second step under such reaction conditions as to produce a polymer product having a viscosity sufficiently less than the viscosity of said polymer product produced in said first step to permit effective separation of said polymer products, removing catalyst complex from the reaction mixture from said second step, admixing an olefin with said catalyst complex under such reaction conditions as to produce a polymer product having a viscosity similar to the viscosity of the polymer product produced in said second step as a third step, combining the reaction mixture from said second and said third steps, and recovering high viscosity and low viscosity polymer products as separate fractions therefrom.

3. A process for the polymerization of olefins comprising admixing an olefin with a solution of metallic halide polymerization catalyst in a solvent under such reaction conditions as to produce a high viscosity polymer product as a first step, discontinuing admixture of further of said olefin with said catalyst solution, maintaining said metallic halide catalyst in solution in said solvent and in admixture with said high viscosity polymer product, admixing a different type olefin from that employed in said first step with said catalyst solution containing said high viscosity polymer product under such reaction conditions as to produce a polymer product having a 210° F. viscosity not greater than about 125 Saybolt Universal seconds and at least 500 Saybolt Universal seconds less than the viscosity of said polymer product produced in said first step as a second step, removing catalyst complex from the reaction mixture from said second step, admixing an olefin with said catalyst complex under such reaction conditions as to produce a polymer product having a 210° F. viscosity not greater than about 125 Saybolt Universal seconds and at least 500 Saybolt Universal seconds less than the viscosity of said polymer product produced in said first step as a third step, combining the reaction mixture from said second and said third steps, and recovering high viscosity and low viscosity polymer products as separate fractions therefrom.

4. The process of claim 3 wherein the olefin employed in the first step is isobutene.

5. The process of claim 3 wherein the olefin employed in the first step is isobutene and the olefin employed in the second step is a 1-olefin having no more than one alkyl substituent on the carbon atom once removed from the terminal carbon atom.

6. The process of claim 3 wherein the olefin employed in the first step is isobutene and the olefin employed in the second step is a 2-olefin.

7. The process of claim 3 wherein the olefin employed in the first step is a 1-olefin having no more than one alkyl substituent on the carbon atoms once removed from the terminal carbon atom.

8. The process of claim 3 wherein the olefin employed in the first step is a 1-olefin having no more than one alkyl substituent on the carbon atom once removed from the terminal carbon atom and the olefin employed in the second step is a 2-olefin.

9. The process of claim 3 wherein the olefin employed in the first step is isobutene and the olefin employed in the second step is propene.

10. The process of claim 3 wherein the olefin employed in the first step is isobutene and the polymerization catalyst is aluminum bromide.

11. The process of claim 3 wherein the olefin employed in the first step is isobutene, the olefin in the second step is propene, and the polymerization catalyst is aluminum bromide.

12. The process of claim 3 wherein the olefin employed in the first step is isobutene, the olefin employed in the second step is a 2-olefin, and the polymerization catalyst is aluminum bromide.

13. The process of claim 3 wherein the olefin employed in the first step is a 1-olefin having no more than one alkyl substituent on the carbon atom once removed from the terminal carbon atom and the polymerization catalyst is aluminum bromide.

14. The process of claim 3 wherein the olefin employed in the first step is a 1-olefin having no more than one alkyl substituent on the carbon atom once removed from the terminal carbon atom, the olefin employed in the second step is a 2-olefin, and the polymerization catalyst is aluminum bromide.

15. A process for the polymerization of olefins comprising admixing an olefin with a solution of metallic halide polymerization catalyst in a solvent to produce a viscous polymer product as a first step, discontinuing admixture of further of said olefin with said catalyst solution, maintaining said metallic halide catalyst in solution in said solvent and in admixture with said viscous polymer product, admixing an olefin of lesser activity than the olefin employed in said first step with said catalyst solution containing said viscous polymer product to produce a polymer product having a 210° F. viscosity not greater than about 125 Saybolt Universal seconds and at least 500 Saybolt Universal seconds less than the viscosity of said polymer product produced in said first step as a second step, removing catalyst complex from the reaction mixture from said second step, admixing an olefin with said catalyst complex to produce a polymer product having a 210° F. viscosity not greater than about 125 Saybolt Universal seconds and at least 500 Saybolt Universal seconds less than the viscosity of said polymer product produced in said first step as a third step, combining the reaction mixture from said second and third steps, and recovering high viscosity and low viscosity polymer products as separate fractions therefrom.

16. A process for the polymerization of olefins comprising admixing an olefin with a solution of metallic halide polymerization catalyst in a solvent to produce a viscous polymer product as a first step, discontinuing admixture of further of said olefin with said catalyst solution, maintaining said metallic halide catalyst in solution in said solvent and in admixture with said viscous polymer product, admixing an olefin of lesser activity than the olefin employed in said first step with said catalyst solution containing said viscous polymer product to produce a polymer product having a 210° F. viscosity not greater than about 125 Saybolt Universal seconds and at least 500 Saybolt Universal seconds less than the viscosity of said polymer product produced in said first step as a second step, removing catalyst complex from the reaction mixture from said second step, admixing an olefin with said catalyst complex to produce a polymer product having a 210° F. viscosity not greater than about 125 Saybolt Universal seconds and at least 500 Saybolt Universal seconds less than the viscosity of said polymer product produced in said first step as a third step, removing catalyst complex from the reactiontion mixture from said third step, combining the remainder of said reaction mixture with the remainder of the reaction mixture from said second step, recovering high viscosity and low viscosity polymer products as separate fractions therefrom, recovering metallic halide catalyst from said complex from said third step, and recycling said recovered metallic halide catalyst to said first step.

17. A process for the polymerization of olefins comprising contacting an olefin with a solution of metallic halide polymerization catalyst to produce a viscous polymer product as a first step, discontinuing contact of said olefin with said catalyst solution, removing catalyst complex from the reaction mixture from said first step, contacting an olefin of lesser activity than the olefin employed in said first step with the remainder of the reaction mixture from said first step to produce a polymer product having a 210° F. viscosity not greater than about 125 Saybolt Universal seconds and at least 500 Saybolt Universal seconds less than the viscosity of the polymer product produced in said first step as a second step, removing catalyst complex from the reaction mixture from said second step, combining the catalyst complex from said first and second steps, contacting an olefin with said combined catalyst complex to produce a polymer product having a 210° F. viscosity not greater than about 125 Saybolt Universal seconds and at least 500 Saybolt Universal seconds less than the viscosity of said polymer product produced in said first step as a third step, removing catalyst complex from the reaction mixture from said third step, combining the remainder of said reaction mixture with the remainder of the reaction mixture from said second step, and recovering high viscosity and low viscosity polymer products as separate fractions therefrom.

DON R. CARMODY.

REFERENCES CITED

The following references are of record in the file of this patent:

UNITED STATES PATENTS

| Number | Name | Date |
|---|---|---|
| 2,139,038 | Russell | Dec. 6, 1938 |
| 2,219,867 | Gay | Oct. 29, 1940 |
| 2,278,445 | Hull | Apr. 7, 1942 |

FOREIGN PATENTS

| Number | Country | Date |
|---|---|---|
| 472,553 | Great Britain | Sept. 27, 1937 |

Certificate of Correction

Patent No. 2,458,977.                                                                January 11, 1949.

DON R. CARMODY

It is hereby certified that error appears in the printed specification of the above numbered patent requiring correction as follows:

Column 8, line 25, for the words "The ratio" read *The mol ratio*; and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*